US011240420B2

(12) United States Patent
Kamba

(10) Patent No.: US 11,240,420 B2
(45) Date of Patent: Feb. 1, 2022

(54) IMAGE PICKUP APPARATUS, SETTING APPARATUS, WAVELENGTH ACQUIRING APPARATUS, AND STORAGE MEDIUM

(71) Applicant: CANON KABUSHIKI KAISHA, Tokyo (JP)

(72) Inventor: Masaki Kamba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/928,979

(22) Filed: Jul. 14, 2020

(65) Prior Publication Data

US 2021/0021754 A1 Jan. 21, 2021

(30) Foreign Application Priority Data

Jul. 18, 2019 (JP) .............................. JP2019-132752

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01); *H04N 5/23296* (2013.01)

(58) Field of Classification Search
CPC ............. H04N 5/23212; H04N 5/2254; H04N 5/23296; H04N 5/33; H04N 5/23245; H04N 5/238; G02B 7/28
See application file for complete search history.

(56) References Cited

U.S. PATENT DOCUMENTS

2017/0111562 A1* 4/2017 Nakamura ........... H04N 5/2353
2017/0264812 A1* 9/2017 Kamba ............. H04N 5/23212

FOREIGN PATENT DOCUMENTS

JP 2009-290537 A 12/2009

* cited by examiner

*Primary Examiner* — Padma Haliyur
(74) *Attorney, Agent, or Firm* — Cowan, Liebowitz & Latman, P.C.

(57) ABSTRACT

An image pickup apparatus includes an image sensor that photoelectrically converts an object image formed by an image pickup optical system including a zoom lens and a focus lens, a data storage that stores focus data indicating an in-focus position of the focus lens according to an object distance and a position of the zoom lens, and a wavelength acquirer that acquires a wavelength of imaging light incident on the image sensor. The focus data includes data for visible light and data according to a wavelength of infrared light. The wavelength acquirer acquires includes the wavelength of the imaging light using the focus data, the object distance, the position of the zoom lens, and a position of the focus lens when the image pickup optical system is in focus in a state where the visible light and the infrared light can enter the image sensor.

9 Claims, 7 Drawing Sheets

■VISIBLE LIGHT FILTER-IN
FOCUS LENS POSITION[mm]

| ZOOM POSITION | OBJECT DISTANCE | |
|---|---|---|
| | INFINITY | 5m |
| WIDE | 0.0 | 0.2 |
| ... | ... | ... |
| MID | 2.0 | 2.5 |
| ... | ... | ... |
| TELE | -0.8 | 0.3 |

■INFRARED LIGHT740nm FILTER-OUT
FOCUS LENS POSITION[mm]

| ZOOM POSITION | OBJECT DISTANCE | |
|---|---|---|
| | INFINITY | 5m |
| WIDE | 0.0 | 0.2 |
| ... | ... | ... |
| MID | 1.8 | 2.3 |
| ... | ... | ... |
| TELE | -0.7 | 0.4 |

■VISIBLE LIGHT FILTER-OUT
FOCUS LENS POSITION[mm]

| ZOOM POSITION | OBJECT DISTANCE | |
|---|---|---|
| | INFINITY | 5m |
| WIDE | -0.6 | -0.4 |
| ... | ... | ... |
| MID | 1.6 | 2.1 |
| ... | ... | ... |
| TELE | -0.9 | 0.2 |

■INFRARED LIGHT940nm FILTER-OUT
FOCUS LENS POSITION[mm]

| ZOOM POSITION | OBJECT DISTANCE | |
|---|---|---|
| | INFINITY | 5m |
| WIDE | 0.2 | 0.4 |
| ... | ... | ... |
| MID | 1.7 | 2.0 |
| ... | ... | ... |
| TELE | -0.3 | 0.8 |

FIG. 4

■INFRARED LIGHT740nm FILTER-OUT
FOCUS LENS POSITION[mm]

| ZOOM POSITION | OBJECT DISTANCE | | | |
|---|---|---|---|---|
| | INFINITY | 10m | 5m | 3m |
| WIDE | 0.0 | 0.1 | 0.2 | 0.3 |

FIG. 5A

■INFRARED LIGHT850nm FILTER-OUT
FOCUS LENS POSITION[mm]

| ZOOM POSITION | OBJECT DISTANCE | | | |
|---|---|---|---|---|
| | INFINITY | 10m | 5m | 3m |
| WIDE | 0.1 | 0.2 | 0.3 | 0.4 |

FIG. 5B

■INFRARED LIGHT940nm FILTER-OUT
FOCUS LENS POSITION[mm]

| ZOOM POSITION | OBJECT DISTANCE | | | |
|---|---|---|---|---|
| | INFINITY | 10m | 5m | 3m |
| WIDE | 0.2 | 0.3 | 0.4 | 0.5 |

FIG. 5C

IMAGE PICKUP APPARATUS, SETTING APPARATUS, WAVELENGTH ACQUIRING APPARATUS, AND STORAGE MEDIUM

BACKGROUND OF THE INVENTION

Field of the Invention

The present invention relates to an image pickup apparatus that can capture images of visible light and/or infrared light.

Description of the Related Art

In an image pickup apparatus, such as a video camera and a surveillance camera, a zoom tracking control may be performed which automatically moves a focus lens to an in-focus position where an object located at a certain distance is in focus during zooming. The zoom tracking control is performed with zoom tracking data (referred to as cam data hereinafter) indicating a relationship between the in-focus position of the focus lens and a position of a zoom lens for each object distance.

The proper cam data differs depending on the wavelength of the imaging light incident on the image sensor, and proper zoom tracking may be unavailable in a night mode even with the cam data that can provide the proper zoom tracking in a daylight mode. It is thus necessary to prepare the cam data for the daylight mode and the cam data for the night mode. In the meanwhile, an image may be captured in a visible light environment or in an infrared light environment in the night mode, and proper cam data for them are different from each other.

Japanese Patent Laid-Open No. ("JP") 2009-290537 discloses an image pickup apparatus that determines whether the in-focus position of the focus lens obtained by autofocus in capturing images of the visible light and infrared light is used for the visible light or for the infrared light, and selects the cam data for the visible or infrared light according to the result.

The image pickup apparatus disclosed in JP 2009-290537 can select the cam data for the visible or infrared light, but cannot select the cam data according to the wavelength of the infrared light. The wavelength range of the infrared light is as wide as approximately 700 nm to 940 nm, and the proper cam data differs depending on the wavelength of the infrared light. Therefore, the cam data may be selected according to the wavelength of the infrared light to be captured. However, it is not easy to mount a spectrophotometer that measures the wavelength of light on an image pickup apparatus or to always prepare a spectrophotometer separate from the image pickup apparatus.

SUMMARY OF THE INVENTION

The present invention provides an image pickup apparatus that can easily acquire a wavelength of imaging light.

An image pickup apparatus according to one aspect of the present invention includes an image sensor configured to photoelectrically convert an object image formed by an image pickup optical system including a zoom lens and a focus lens, a data storage configured to store focus data indicating an in-focus position of the focus lens according to an object distance and a position of the zoom lens, and a wavelength acquirer configured to acquire a wavelength of imaging light incident on the image sensor. The focus data includes data for visible light and data according to a wavelength of infrared light. The wavelength acquirer acquires includes the wavelength of the imaging light using the focus data, the object distance, the position of the zoom lens, and a position of the focus lens when the image pickup optical system is in focus in a state where the visible light and the infrared light can enter the image sensor.

A setting apparatus used with the above image pickup apparatus configured to set through a user at least one of a wavelength range and a timing for acquiring the wavelength of the imaging light and the object distance of the focus data used to acquire the wavelength of the imaging light also constitutes another aspect of the present invention.

A wavelength acquiring method for the above image pickup apparatus and a non-transitory computer-readable storage medium storing the wavelength acquiring method also constitute another aspect of the present invention.

Further features of the present invention will become apparent from the following description of exemplary embodiments with reference to the attached drawings.

BRIEF DESCRIPTION OF THE DRAWINGS

FIG. 4 illustrates a numerical example of cam data according to a wavelength of imaging light and a filter state.

FIGS. 5A to 5C illustrate a numerical example of cam data for the infrared light.

DESCRIPTION OF THE EMBODIMENTS

Referring now to the accompanying drawings, a description will be given of embodiments according to the present invention.

First Embodiment

Figure 1:
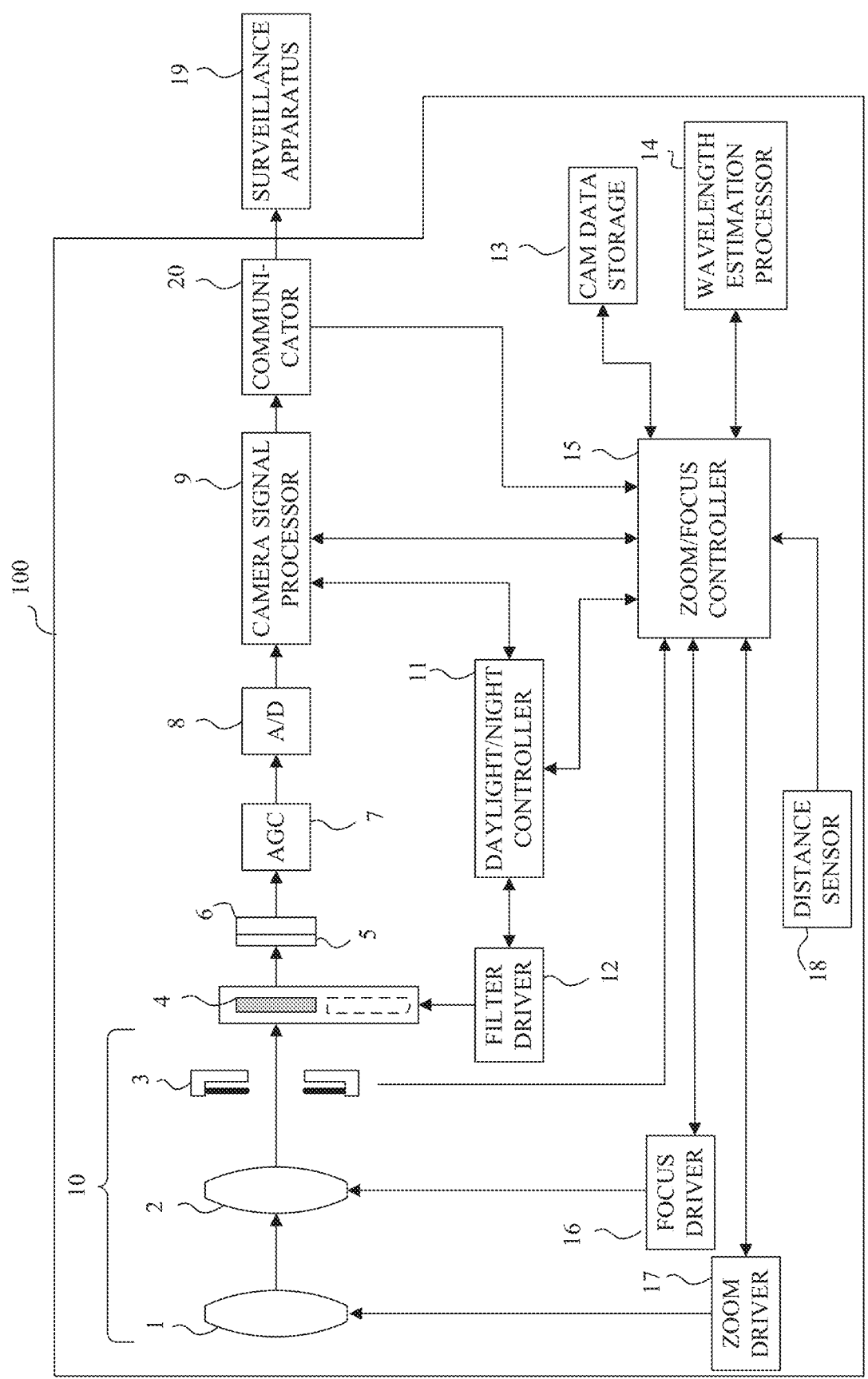
FIG. 1 is a block diagram illustrating a configuration of an image pickup apparatus according to first and second embodiments of the present invention.

FIG. 1 illustrates a configuration of an image pickup apparatus as a first embodiment of the present invention. An image pickup apparatus 100 has an image pickup optical system 10. The image pickup optical system 10 includes a zoom lens (magnification varying lens) 1 that moves in the optical axis direction to change a focal length, a focus lens 2 that moves in the optical axis direction during focusing, and a diaphragm unit (aperture stop) 3 that adjusts a light amount. A zoom driver 17 drives the zoom lens 1 in accordance with a zoom command from a zoom/focus controller 15 described later, and sends information on its position (referred to as a zoom lens position hereinafter) to the zoom/focus controller 15. A focus driver 16 drives the focus lens 2 in response to a focus command from the zoom/focus controller 15 and sends information on its position (referred to as a focus lens position hereinafter) to the zoom/focus controller 15. The zoom driver 17 and the focus driver 16 function as a lens position acquirer.

Imaging light emitted from an unillustrated object and passing through the image pickup optical system 10 reaches an image sensor 6 through an infrared cutting filter (IRCF) 4 and a color filter 5, and forms an object image on the image sensor 6. The image sensor 6 photoelectrically converts (images) an object image and outputs an electrical signal. The infrared cutting filter 4 is a filter for luminosity correction that does not pass (cut) near-infrared light in order to match the color reproducibility of the image pickup apparatus 100 with a human color vision characteristic.

An analog image pickup signal as an electric signal output from the image pickup apparatus 6 is gain adjusted by an AGC 7 and converted into a digital image pickup signal by an A/D converter 8. A camera signal processor 9 performs image processing for the digital image pickup signal to generate a video signal, outputs the video signal to the communicator 20, and acquires information necessary for autofocus (AF) from the video signal.

The image pickup apparatus 100 according to this embodiment, the infrared cutting filter 4 can be inserted into and removed from an image pickup optical path from the image pickup optical system 10 to the image sensor 6 by the filter driver 12. Then, as the imaging mode, it is possible to set a daylight mode in which the infrared cutting filter 4 is inserted in the imaging optical path and a night mode in which the infrared cutting filter 4 is not inserted in the imaging optical path. In the night mode, visible light and infrared light can enter the image sensor 6. The camera signal processor 9 generates a color video signal as a video signal during imaging in the daylight mode, and generates a monochrome video signal as a video signal at the time of shooting in the night mode.

A communicator 20 transmits the video signal to a monitoring monitor device 19 outside the image pickup apparatus 100. The monitoring monitor device 19 can display an image corresponding to the image signal received from the communicator 20. The monitoring monitor device 19 also transmits a lens drive command to the zoom/focus controller 15 in the image pickup apparatus 100 via the communicator 20. A distance sensor 18 measures an object distance, and sends information on the object distance to the zoom/focus controller 15. Although the distance sensor 18 built in the image pickup apparatus 100 is illustrated in FIG. 1, the distance sensor 18 may be externally attached to the image pickup apparatus 100.

The daylight/night controller 11 performs an automatic daylight/night control in which a filter driver 12 inserts and removes the infrared cutting filter 4 into and from the image pickup optical path based on the luminance indicated by the luminance signal in the video signal output from the camera signal processor 9. More specifically, when the brightness exceeds the switching threshold for a certain period of time or more, the filter driver 12 inserts the infrared cutting filter 4 into the imaging optical path so that the imaging in the daylight mode can be performed, and the brightness keeps the switching threshold constant. When the time falls below the time, the filter driver 12 retracts the infrared cutting filter 4 outside the imaging optical path so that the imaging in the night mode can be performed.

However, as soon as the infrared light reaches the image sensor 6 in the night mode and the brightness indicated by the brightness signal becomes high, the mode is switched to the daylight mode, and the infrared light does not reach the image sensor 6 in the daylight mode and the brightness signal is changed. It is necessary to prevent hunting in which the mode returns to the night mode again when the brightness shown becomes low. Therefore, the daylight/night controller 11 acquires the wavelength estimation result of the imaging light in the wavelength estimation processor 14 in the night mode, and only when the imaging light is determined to be visible light from the wavelength estimation result, a control of switching to the daylight mode is performed.

A cam data storage 13 as a data storage receives information on the position of the zoom lens 1 (referred to as a zoom lens position hereinafter) and the position of the focus lens 2 (referred to as a focus lens position hereinafter) from the zoom/focus controller 15. At the same time, the insertion removal state of the infrared cutting filter 4 and the imaging light information are acquired. In the following description, a state in which the infrared cutting filter 4 is inserted in the imaging optical path is called a filter inserted state, and a state in which it is not inserted in the imaging optical path is called a filter non-insertion state. Moreover, these states are collectively called a filter state.

The imaging light information is information indicating whether the imaging light is visible light or infrared light, and further the wavelength of infrared light. Then, the cam data storage 13 acquires the cam data (zoom tracking data) corresponding to the received zoom lens position, focus lens position, filter state, and imaging light information.

Figure 2:
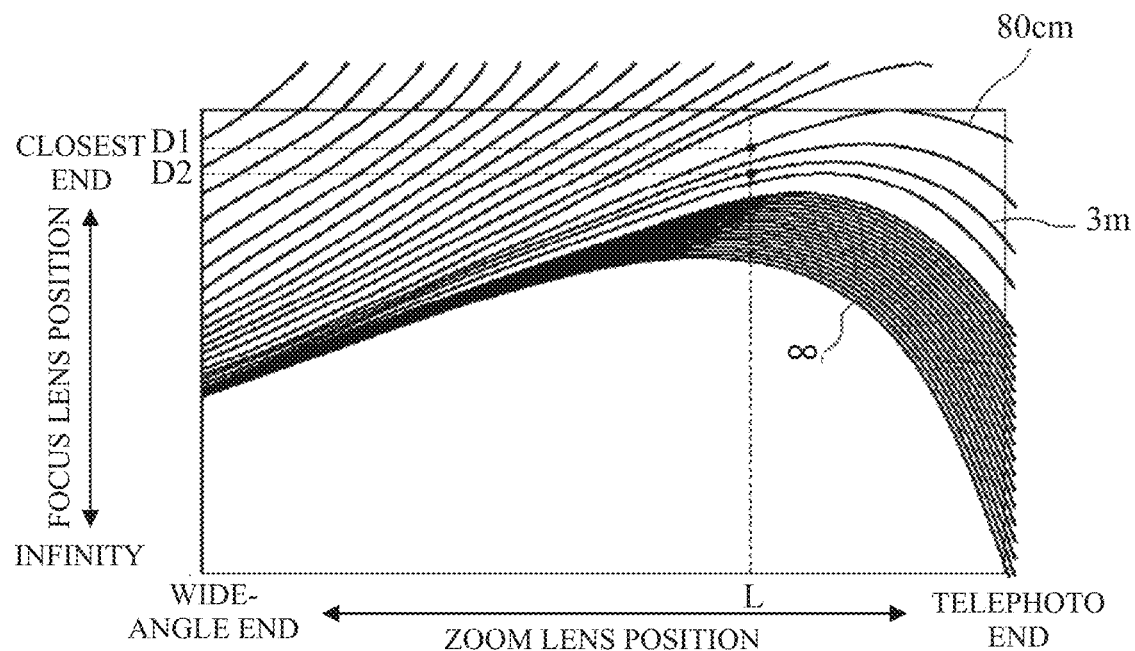
FIG. 2 illustrates cam data for zoom tracking.

As illustrated in FIG. 2, the cam data is prepared for each typical object distance from the closest end to infinity, and the image pickup optical system is provided for each zoom lens position from the wide-angle end (WIDE) to the telephoto end (TELE). Reference numeral 10 denotes focus data indicating a focus lens position (focus position) for focusing. When the zoom lens 1 is moved and zooming is performed while focusing on a certain object distance, the zoom/focus controller 15 follows the focus lens 2 according to the cam data (use cam data) corresponding to the object distance is moved to perform zoom tracking control for maintaining the in-focus state with respect to the object distance.

The cam data storage 13 according to this embodiment stores cam data for each filter state (filter inserted state and filter non-inserted or retracted state) and for each representative wavelength of the imaging light (wavelengths of the visible light and the infrared light) as well as for each representative object distance. For example, in FIG. 3, (a) represents cam data corresponding to infinity when the imaging light is the visible light in the filter inserted state (Filter-in). (b) represents cam data corresponding to infinity when the imaging light is the visible light in the filter non-inserted state (Filter-out). (c) represents cam data corresponding to infinity when the imaging light is the infrared light having a wavelength of 740 nm in the filter non-inserted state. (d) represents cam data corresponding to infinity when the imaging light is the infrared light having a wavelength of 940 nm in the filter non-inserted state.

Figure 3:
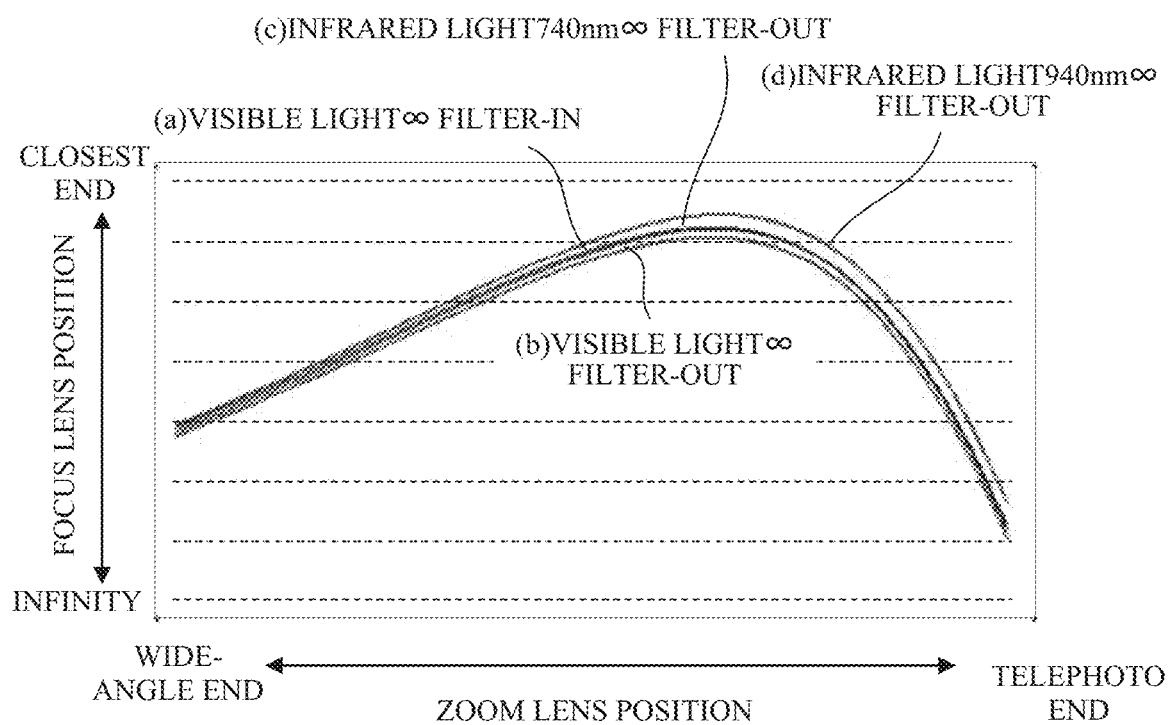
FIG. 3 illustrates cant data for the visible and infrared light.

The magnitude of the cam data difference caused by the imaging light and the insertion/ejection (existence/nonexistence) of the infrared cutting filter differs depending on the optical configuration of the image pickup optical system 10, and when the difference exceeds the depth of field of the image pickup optical system 10, the maintenance accuracy of the in-focus state lowers, in the cam data of (a) and (b) in FIG. 3, the imaging light is the same visible light, and thus has a difference that depends on the insertion/ejection of the infrared cutting filter, the thickness and transmittance of the infrared cutting filter in the filter inserted state, etc.

FIG. 4 illustrates a numerical example of the cam data for each representative object distance, for each filter state, and for each representative imaging light. In the filter inserted state, the infrared light is cut off, so that the cam data becomes the same as the visible light. When an infrared bandpass filter (IRBPF) or the like that allows only part of the infrared light to pass it is inserted in the imaging optical path instead of the infrared cutting filter 4, a cam data that corresponds to the filter is necessary.

For the representative object distance and the representative imaging light, the cam data storage 13 extracts the cam data corresponding to that object distance and that imaging light and corresponding to the filter state, and sends it as use cam data to the zoom/focus controller 15. For the object distance different from the representative object distance and imaging light different from the representative imaging light, it calculates the use cam data by the interpolation calculation using the stored cam data and sends it to the zoom/focus controller 15.

The wavelength estimation processor 14 as a wavelength acquirer receives the use cam data, the current zoom lens position, the current focus lens position, the current filter state, and the current object distance from the zoom/focus controller 15, and performs processing for estimating the current wavelength of the imaging light.

Referring now to FIGS. 4 and 5A to 5C, a description will be given of the wavelength estimation processing. In this embodiment, assume that the image pickup apparatus has been adjusted in the factory shipment so that the focus lens position becomes a reference (0 mm) when the zoom lens position (zoom position in the figure) is WIDE (wide-angle end), the object distance is at infinity, the imaging light is the visible light, and the filter state is the filter inserted state. In the daylight mode, since the filter is inserted, the image pickup light becomes the visible light, and the zoom lens position and the filter state are recognized by the zoom/focus controller 15 and the daylight/night controller 11. Hence, the object distance can be calculated from the cam data by also using information on the in-focus position by the AF. As a result, a zoom tracking control using proper cam data can be performed.

However, the in-focus position varies depending on the wavelength of infrared light (referred to as an infrared wavelength hereinafter) in the night mode, and thus in order to determine proper cam data, information on either the object distance or the infrared wavelength is required. FIGS. 5A to 5C illustrate the focus lens positions on the cam data for each object distance for three types of infrared wavelengths when the zoom lens position is WIDE and the filter state is the filter non-insertion state. For example, as illustrated in FIGS. 5A to 5C, the object distance at which the in-focus state is obtained at a focus lens position of 0.3 mm from the reference is one of 3 m at the infrared wavelength of 740 nm, 5 m at the infrared wavelength of 850 nm, and 10 m at the infrared wavelength of 940 nm.

This embodiment uses as the distance acquirer a distance sensor 18 that can be easily mounted on or externally attached to the image pickup apparatus 100. The distance sensor method includes an ultrasonic method and a laser method using the infrared light, but any methods may be used. When the image sensor 6 can receive light from different areas on the exit pupil in the image pickup optical system 10, the object distance may be calculated using the phase difference signal obtained from the image sensor 6 and in this case, the image sensor 6 serves as the distance acquirer. When the distance accuracy cannot be maintained in the infrared environment, a distance map that is created by measuring the distance to each part in the field in the daylight mode may be retained, and distance information in a range in which the moving object is not detected in the distance map may be used. If the object distance can be calculated from the zoom lens position and the focus lens position, the distance sensor 18 may not be used and in this case, the zoom/focus controller 15 that calculates the object distance may serve as the distance acquirer.

The wavelength estimation processor 14 performs wavelength estimation processing for estimating (acquiring) the wavelength of the imaging light using the object distance obtained by the distance sensor 18, the zoom lens position acquired when the in-focus state is actually obtained, the filter state, and the focus lens position (referred to as an actual in-focus position hereinafter). The focus lens position on the cam data will be referred to as a data in-focus position hereinafter. More specifically, the wavelength estimation processor 14 can acquire, as an estimated wavelength, the wavelength (visible light wavelength and/or infrared wavelength) corresponding to the cam data by acquiring the actual in-focus position when the filter state is the filter non-inserted state, by selecting one of the cam data corresponding to the plurality of wavelengths, in which the data in-focus position for the zoom lens position and the object distance coincides with the actual in-focus position.

If there is no cam data in which the data in-focus position coincides with the actual in-focus position, the estimated wavelength may be obtained by selecting the cam data in which the data in-focus position is the closest to the actual in-focus position or the estimated wavelength may be calculated by linearly interpolating the wavelengths corresponding to a plurality of cam data in which the data in-focus position is close to the actual in-focus position. The larger the cam data amount for each wavelength is, the higher the estimation accuracy can become, but the cam data amount may be properly selected in consideration of the memory capacity required for the cam data storage 13 that stores the cam data. For example, it is desirable to store the cam data at wavelength intervals that do not belong to the same depth of field of the image pickup optical system or that do not reduce the estimation accuracy by the linear interpolation.

The zoom/focus controller 15 acquires, from the cam data storage 13, the use cam data corresponding to the estimated wavelength acquired by the wavelength estimation processor 14 and sends information on the target focus lens position as the data in-focus position along the use cam data during zooming to the focus driver 16. The focus driver 16 drives the focus lens 2 to the target focus lens position. Thereby, a zoom tracking control is properly performed according to the wavelength of the imaging light in the night mode. The zoom/focus controller 15 and the daylight/night controller 11 constitute a controller.

Figure 6:
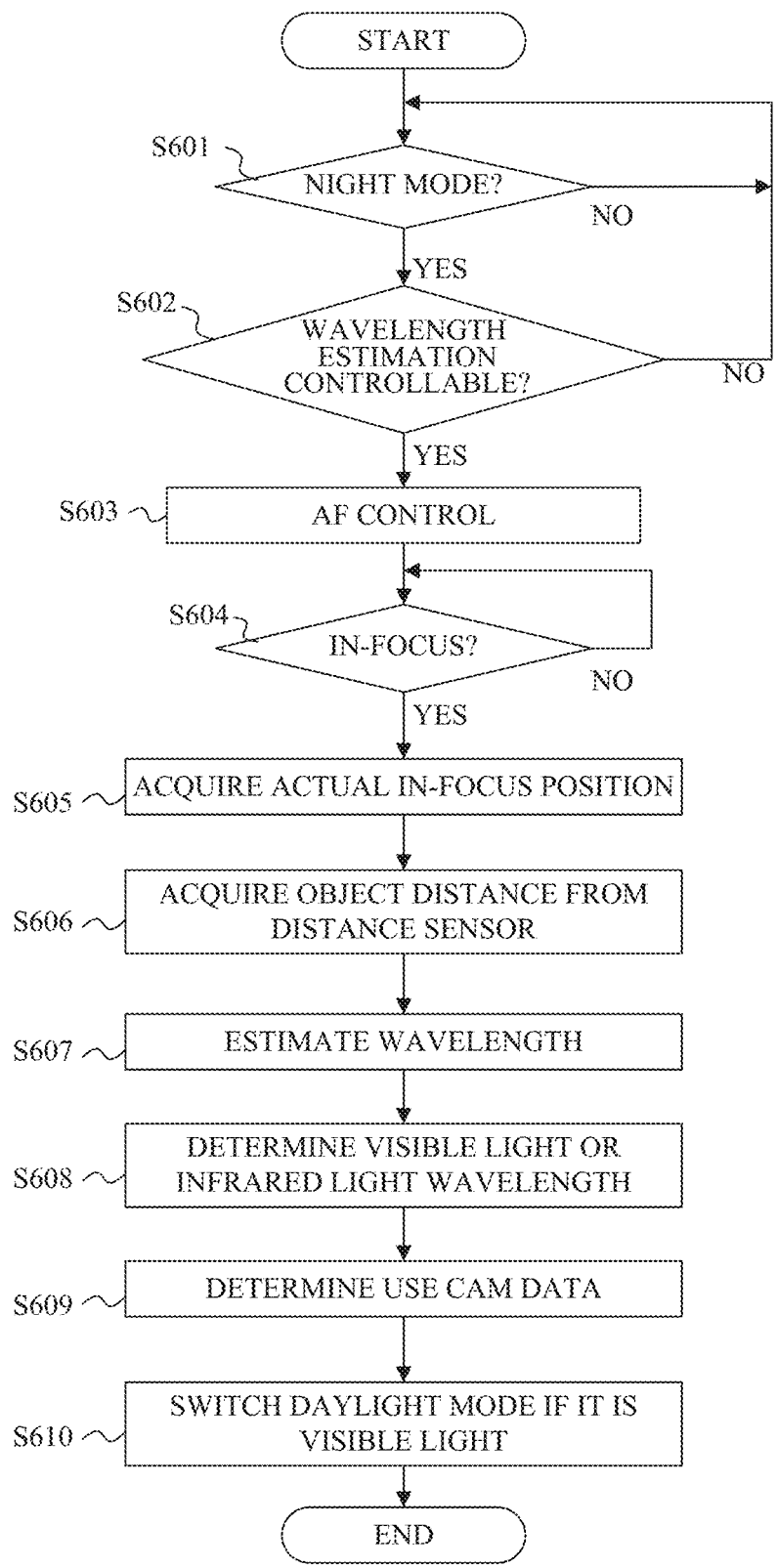
FIG. 6 is a flowchart showing processing performed in a night mode according to the first and second embodiments.

Referring now to FIG. 6, a description will be given of processing of acquiring the estimated wavelength in the night mode and of performing the zoom tracking control and the daylight/night controls. The zoom/focus controller 15 and the wavelength estimation processor 14 serve as a computer and execute this processing according to a computer program.

First, in the step S601, the zoom/focus controller 15 confirms with the daylight/night controller 11 whether or not the current imaging mode is the night mode. Since the filter is inserted in the daylight mode and wavelength estimation is unnecessary, the zoom/focus controller 15 repeats the confirmation of this step. On the other hand, in case of the night mode, the flow proceeds to the step S602.

In the step S602, the zoom/focus controller 15 determines whether the wavelength can be estimated. The wavelength estimation is unavailable mainly due to the low focusing accuracy by the AF, such as a case where the diaphragm unit 3 is narrowed down to a predetermined minimum aperture state. In the minimum aperture state, the depth of field becomes deep and the focus lens position may deviate from the cam data even though it is in focus. In addition, where the gain of the image sensor 6 is higher than a predetermined gain, a noise amount in the video signal increases and the focusing accuracy becomes low. Such a case is also included. When the shutter speed during imaging is lower than the predetermined speed (or exposure time is longer), the moving object blurs and the focusing accuracy lowers. Moreover, when the object luminance is located outside (lower or higher than) the predetermined luminance range in a dark environment or backlight environment, the focusing accuracy becomes low. These cases are also included. The zoom/focus controller 15 returns to the step S601 without performing the wavelength estimation if wavelength estimation is unavailable, and proceeds to the step S603 if wavelength estimation is available.

In the step S603, the zoom/focus controller 15 starts the AF control. The AF method is not particularly limited, but a contrast detection method can be used.

Next, in the step S604, the zoom/focus controller 15 determines whether or not the in-focus state is obtained. When the in-focus state is obtained, the actual in-focus position which is the focus lens position at this time is obtained in the step S605.

Next, in the step S606, the zoom/focus controller 15 acquires the object distance through the distance sensor 18. The object distance acquired herein is the distance to the object that is the AF target in the captured image.

Next, in the step S607, the zoom/focus controller 15 sends the information on the actual in-focus position and the object distance acquired in the steps S605 and S606 and the information on the current zoom lens position and the filter state to the wavelength estimation processor 14. The wavelength estimation processor 14 acquires the current estimated wavelength of the imaging light by the above method, and sends the estimated wavelength to the zoom/focus controller 15. In the step S608, the zoom/locus controller 15 that has received the estimated wavelength determines whether the imaging light is the visible light, and determines the wavelength of the infrared light if it is not the visible light.

Figure 7:
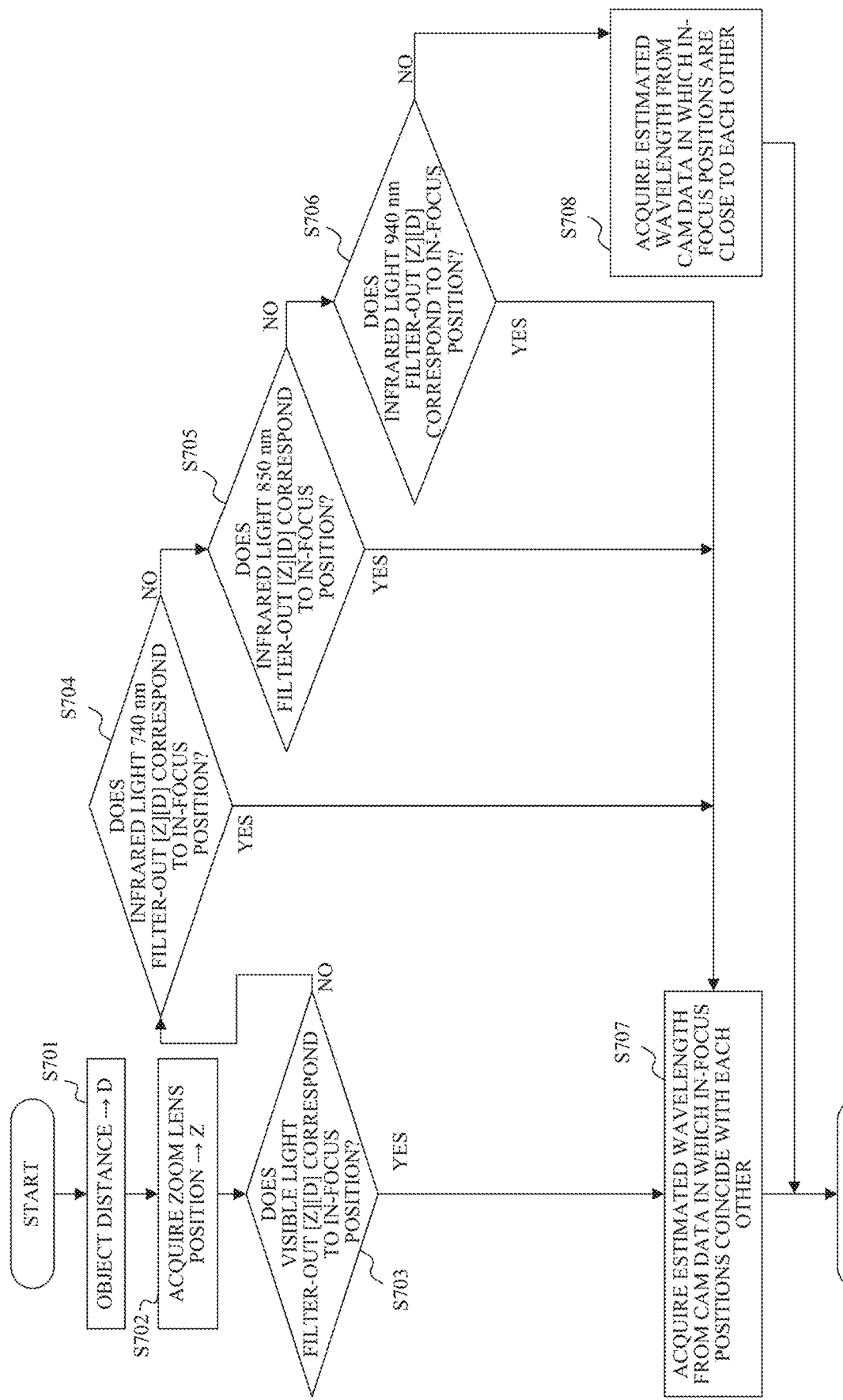
FIG. 7 is a flowchart showing wavelength estimation processing according to the first and second embodiments.

A flowchart in FIG. 7 describes details of the processing performed by the zoom/focus controller 15 in the steps S607 and S608. In the step S701, the zoom/focus controller 15 stores the object distance acquired in the step S606 in the variable D.

Next, in the step S702, the zoom/focus controller 15 acquires the current zoom lens position, and stores it in the variable Z. The zoom lens position used for the wavelength estimation may be any position.

Next, in the step S703, the zoom/focus controller 15 compares the data in-focus position for the zoom lens position [Z] in the cam data corresponding to the visible light, the filter non-inserted state, and the object distance [D] with the actual in-focus position acquired in the step S605. When the data in-focus position and the actual in-focus position do not coincide with each other, the zoom/focus controller 15 proceeds to the step S704, and to the step S707 when they coincide with each other.

In the step S704, the zoom/focus controller 15 compares the data in-focus position for the zoom lens position [Z] in the cam data corresponding to the infrared light with a wavelength of 740 nm, the filter non-inserted state, and the object distance [D] with the actual in-focus position. If the data in-focus position and the actual in-focus position do not coincide with each other, the zoom/focus controller 15 proceeds to the step S705, and to the step S707 if they coincide with each other.

In the step S705, the zoom/focus controller 15 compares the data in-focus position for the zoom lens position [Z] in the cam data corresponding to the infrared light with a wavelength of 850 nm, the filter non-inserted state, and the object distance [D] with the actual in-focus position. If the data in-focus position and the actual in-focus position do not coincide with each other, the zoom/focus controller 15 proceeds to the step S706, and to the step S707 if they coincide with each other.

In the step S706, the zoom/locus controller 15 compares the data in-focus position for the zoom lens position [Z] in the cam data corresponding to the infrared light with a wavelength of 940 nm, the filter non-inserted state, and the object distance [D] with the actual in-focus position. If the data in-focus position and the actual in-focus position do not coincide with each other, the zoom/focus controller 15 proceeds to the step S708, and to the step S707 if they coincide with each other.

In the step S707, the zoom/focus controller 15 acquires, as the estimated wavelength, the wavelength corresponding to the cam data in which the data in-focus position and the actual in-focus position coincide with each other.

On the other hand, in the step S708, the zoom/focus controller 15 acquires, as the estimated wavelength, the wavelength corresponding to the cam data in which the data in-focus position is the closest to the actual in-focus position or the wavelength obtained by interpolating the wavelengths corresponding to a plurality of cam data in which the data in-focus position is close to the actual in-focus position, among the cam data corresponding to the visible light and the infrared wavelengths with 740 nm to 940 nm used for the comparisons in the steps S703 to S706. The cam data used to compare the data in-focus position with the actual in-focus position is not limited to the above four cam data. As described above, the estimated wavelength can be obtained in the same manner when another filter such as IRBPF is used instead of the IRCF. When the IRBPF is used, the estimated wavelength is acquired by using only the cam data corresponding to the wavelength within the wavelength range of the infrared light (partial wavelength light) that passes the IRBPF. Thereby, the wavelength estimation range can be narrowed.

In the step S609 in FIG. 6, the zoom/focus controller 15 determines the use cam data corresponding to the estimated wavelength obtained in the steps S507 and S608, and acquires it from the cam data storage 13. Then, the zoom/focus controller 15 performs the zoom tracking control using the cam data used during zooming.

Next, in the step S610, the daylight/night controller 11 acquires the information on the estimated wavelength from the zoom/focus controller 15, and switches the imaging mode from the night mode to the daylight mode if the estimated wavelength is the visible light wavelength. That is, the infrared cutting filter 4 is inserted into the image pickup optical path. In this way, the proper auto daylight/night control is available even in the infrared environment with a high luminance.

This embodiment estimates the wavelength of the imaging light, and can perform a highly accurate zoom tracking control using the cam data according to the estimated wavelength and perform the proper auto daylight/night control.

While this embodiment has described the lens integration type image pickup apparatus in which the image pickup optical system (lens) is integrated with the image pickup apparatus, but the embodiment of the present invention covers a lens interchangeable type image pickup apparatus in which the image pickup optical system is detachable from the image pickup apparatus.

Second Embodiment

Figure 8:
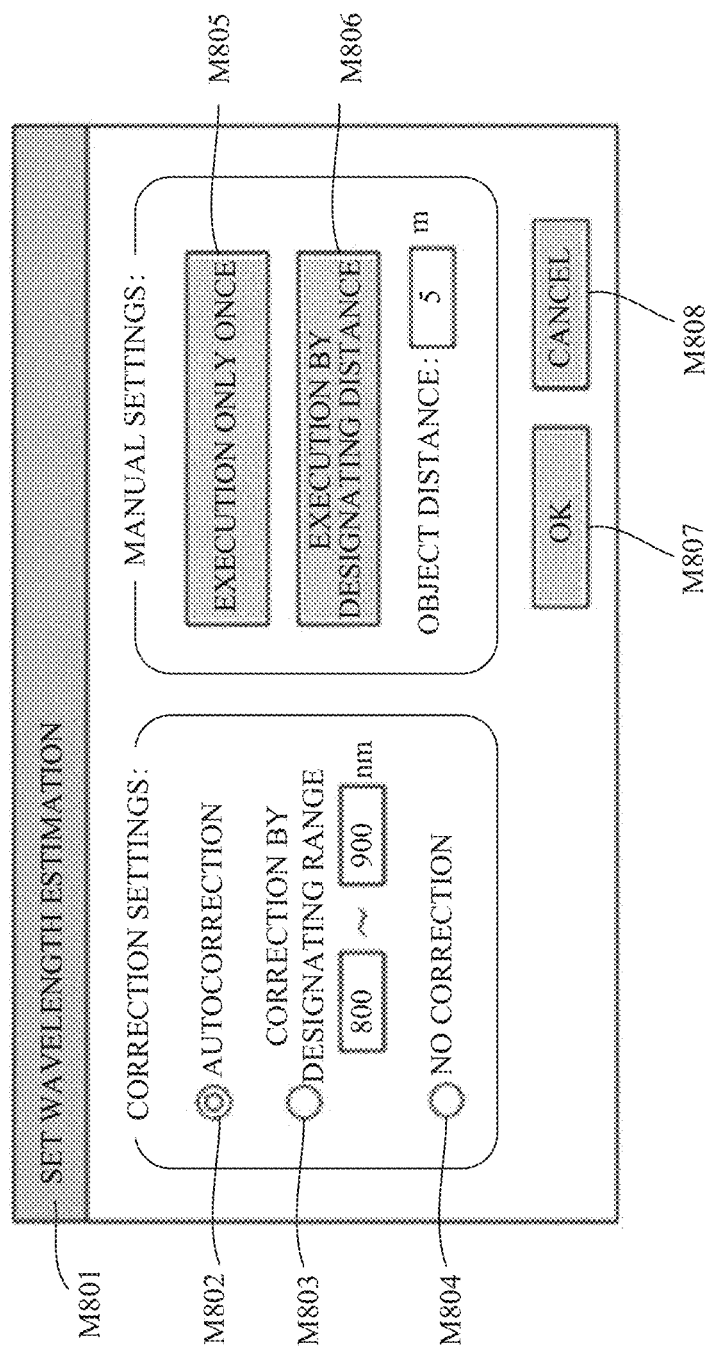
FIG. 8 illustrates a wavelength estimation setting application image according to the second embodiment.

Next follows a second embodiment according to the present invention. The configuration of the image pickup apparatus according to this embodiment is the same as that of the image pickup apparatus 100 according to the first embodiment. In this embodiment, a surveillance apparatus (setting apparatus) 19 illustrated in FIG. 1 is a computer in which an application for setting the wavelength estimation is installed, and a setting image (window) M801 illustrated in FIG. 8 can be displayed. The surveillance apparatus 19 allows the user to provide the settings through the setting image M801 relating to the wavelength estimation (wavelength acquirer) described in the first embodiment, more specifically, the correction settings using the wavelength estimation and the manual settings relating to the wavelength estimation.

The correction settings can provide the user settings for corrections using the estimated wavelength for the zoom tracking control and the auto daylight/night control. When the user selects "autocorrection" M802 in the "correction settings" item in FIG. 8, the correction is made without limiting the wavelength range in which the wavelength of the imaging light is estimated. When "correction by designating range" M803 is selected, the correction is made by limiting the wavelength range for estimating the wavelength of the imaging light to the range (such as 800 to 900 nm) input by the user. When "no correction" M804 is selected, the above correction is not performed.

When the user selects "execution only once" M805 in "manual setting", the above correction is immediately executed at the selection timing. When "execution by designating distance" M806 is selected, the above correction is immediately executed at an object distance (such as 5 m) input and designated by the user. In this case, the object distance is not acquired from the distance sensor 18.

When the user presses "OK button" M807, the correction state is saved and the setting image M801 is closed. When "cancel button" M808 is pressed, the setting image M801 is closed without saving the correction state.

The usability of the image pickup apparatus can be improved by making settings relating to the wavelength estimation through such the setting image.

The above application may be installed in the image pickup apparatus, and displayed on a display unit such as a rear monitor of the image pickup apparatus.

The above embodiments can easily acquire the wavelength of the imaging light, and further perform the proper control according to the wavelength.

Other Embodiments

Embodiment(s) of the present invention can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132752, filed on Jul. 18, 2019, which is hereby incorporated by reference herein in its entirety.

What is claimed is:
1. An image pickup apparatus comprising:
an image sensor configured to photoelectrically convert an object image formed by an image pickup optical system including a zoom lens and a focus lens;
a data storage configured to store focus data indicating an in-focus position of the focus lens according to an object distance and a position of the zoom lens; and
a wavelength acquirer configured to acquire a wavelength of imaging light incident on the image sensor,
wherein the focus data includes data for visible light and data according to a wavelength of infrared light,
wherein the wavelength acquirer acquires the wavelength of the imaging light using the focus data, the object distance, the position of the zoom lens, and a position of the focus lens when the image pickup optical system is in focus in a state where the visible light and the infrared light can enter the image sensor,
wherein where a data in-focus position represents the in-focus position of the focus lens in the focus data, and an actual in-focus position represents the position of the focus lens in the image pickup optical system that is in focus, the wavelength acquirer acquires, as the wavelength of the imaging light, a wavelength that corresponds to one of the focus data in which the data in-focus position for the object distance and the position of the zoom lens when the image pickup optical system is in focus coincides with the actual in-focus position, and
wherein there is no focus data in which the data in-focus position for the object distance and the position of the zoom lens when the image pickup optical system is in focus coincides with the actual in-focus position, the wavelength acquirer acquires, as the wavelength of the imaging light, a wavelength of one of the focus data in which the data in-focus position is the closest to the actual in-focus position or a wavelength obtained by an interpolation using at least one of the focus data in which the data in-focus position is close to the actual in-focus position.

2. The image pickup apparatus according to claim 1, wherein the wavelength acquirer does not acquire the wavelength of the imaging light, at least one of when an aperture stop in the image pickup optical system has a predetermined minimum aperture state, when a gain of the image sensor is higher than a predetermined gain, when a shutter speed is lower than a predetermined speed, and when a luminance of the object is located outside a predetermined luminance range.

3. The image pickup apparatus according to claim 1, further comprising a controller configured to control moving the focus lens using one of the focus data corresponding to the wavelength of the imaging light acquired by the wavelength acquirer, which is stored in the data storage or generated by an interpolation using the focus data, according to a movement of the zoom lens.

4. The image pickup apparatus according to claim 1, further comprising:
   a filter configured to prevent infrared light from passing the filter or allow only partial wavelength light of the infrared light to pass the filter;
   a filter driver configured to insert the filter in and remove the filter from an image pickup optical path toward the image sensor; and
   a controller configured to control the filter driver according to the wavelength of the imaging light acquired by the wavelength acquirer.

5. The image pickup apparatus according to claim 4, wherein when the filter inserted in the imaging optical path passes only the partial wavelength light, the wavelength acquirer acquires the wavelength of the imaging light using one of the focus data corresponding to a wavelength within a wavelength range of the partial wavelength light.

6. The image pickup apparatus according to claim 1, wherein the wavelength acquirer is configured to set through a user at least one of a wavelength range and a timing for acquiring the wavelength of the imaging light and the object distance of the focus data used to acquire the wavelength of the imaging light.

7. A setting apparatus used with the image pickup apparatus according to claim 1, and configured to set through a user at least one of a wavelength range and a timing for acquiring the wavelength of the imaging light and the object distance of the focus data used to acquire the wavelength of the imaging light.

8. A wavelength acquiring method for an image pickup apparatus that includes an image sensor configured to photoelectrically convert an object image formed by an image pickup optical system including a zoom lens and a focus lens, the wavelength acquiring method comprising the steps of:
   preparing focus data indicating an in-focus position of the focus lens according to an object distance and a position of the zoom lens; and
   acquiring a wavelength of imaging light incident on the image sensor,
   wherein the focus data includes data for visible light and data according to a wavelength of infrared light,
   wherein the acquiring step acquires the wavelength of the imaging light using the focus data, the object distance, the position of the zoom lens, and a position of the focus lens when the image pickup optical system is in focus in a state where the visible light and the infrared light can enter the image sensor,
   wherein where a data in-focus position represents the in-focus position of the focus lens in the focus data, and an actual in-focus position represents the position of the focus lens in the image pickup optical system that is in focus, the acquiring step acquires, as the wavelength of the imaging light, a wavelength that corresponds to one of the focus data in which the data in-focus position for the object distance and the position of the zoom lens when the image pickup optical system is in focus coincides with the actual in-focus position, and
   wherein there is no focus data in which the data in-focus position for the object distance and the position of the zoom lens when the image pickup optical system is in focus coincides with the actual in-focus position, the acquiring step acquires, as the wavelength of the imaging light, a wavelength of one of the focus data in which the data in-focus position is the closest to the actual in-focus position or a wavelength obtained by an interpolation using at least one of the focus data in which the data in-focus position is close to the actual in-focus position.

9. A non-transitory computer-readable storage medium storing a computer program that causes a computer in an image pickup apparatus having an image sensor configured to photoelectrically convert an object image formed by an image pickup optical system including a zoom lens and a focus lens, to execute a wavelength acquiring method according to claim 8.

* * * * *